(12) United States Patent
Maier

(10) Patent No.: US 9,819,928 B2
(45) Date of Patent: Nov. 14, 2017

(54) DEVICE FOR THE CALIBRATION OF A MULTI-CAMERA RECORDING DEVICE FOR THREE DIMENSIONAL PICTURE RECORDING

(71) Applicant: Florian Maier, Gilching (DE)

(72) Inventor: Florian Maier, Gilching (DE)

( * ) Notice: Subject to any disclaimer, the term of this patent is extended or adjusted under 35 U.S.C. 154(b) by 27 days.

(21) Appl. No.: 14/050,331

(22) Filed: Oct. 9, 2013

(65) Prior Publication Data

US 2017/0163967 A1    Jun. 8, 2017

Related U.S. Application Data

(63) Continuation-in-part of application No. PCT/DE2012/000382, filed on Apr. 8, 2012.

(30) Foreign Application Priority Data

Apr. 9, 2011   (DE) .................... 20 112 005 083 U

(51) Int. Cl.
| | |
|---|---|
| H04N 13/02 | (2006.01) |
| H04N 13/00 | (2006.01) |
| G02B 27/10 | (2006.01) |
| G02B 27/22 | (2006.01) |

(52) U.S. Cl.
CPC ....... *H04N 13/0246* (2013.01); *G02B 27/106* (2013.01); *G02B 27/22* (2013.01); *H04N 13/0022* (2013.01); *H04N 2213/001* (2013.01)

(58) Field of Classification Search
None
See application file for complete search history.

(56) References Cited

U.S. PATENT DOCUMENTS

| | | | | |
|---|---|---|---|---|
| 2,630,737 | A * | 3/1953 | Ramsdell | G03B 35/00 352/60 |
| 6,674,462 | B1 * | 1/2004 | Ooshima | A61B 5/0073 348/42 |

* cited by examiner

*Primary Examiner* — Heather Jones
(74) *Attorney, Agent, or Firm* — Henry M. Feiereisen LLC

(57) ABSTRACT

Device for the calibration of a multi-camera recording device for three dimensional picture recording, where the calibration occurs on two depth levels consisting of a calibration chart which features at least one characteristic for geometric positioning on a two-dimensional space and if applicable at least one characteristic for the calibration of further traits of the camera system characterized by the calibration chart being used for near calibration and it being at least partially transparent or a space being cut out of it and where behind the calibration chart at least one additional natural or artificial calibration element is available for distance calibration.

13 Claims, 2 Drawing Sheets

DEVICE FOR THE CALIBRATION OF A MULTI-CAMERA RECORDING DEVICE FOR THREE DIMENSIONAL PICTURE RECORDING

The invention concerns a device for the calibration of a multi-camera recording device for three dimensional picture recording, where the calibration occurs on two depth levels.

STATE OF THE ART

For the capture of images that appear to be three-dimensional and are displayed with multi-channel image presentation techniques, at least two views of the object to be recorded are necessary. The individual images are then merged to a single three-dimensional appearing image. (e.g. according to Falk, D.; Brill, D.; Stork, D.; Ein Blick ins Licht: Einblicke in die Natur des Lichts und des Sehens, in Farbe und Fotografie; Birkhäuser Verlag, Basel-Boston und Springer Verlag, Berlin-Heidelberg; 1990; page 230 ff). These pictures can be visualized with known picture separation methods. All these methods require at least two views of an object from different perspectives. These views are usually generated with at least two cameras which are positioned in different, neighboring perspectives. (see Sand R.; Dreidimensionales Fernsehen; in DE-Z: Fernseh-und Kino-Technik, 37, No. 8/1983; page 321 ff). These cameras are either pointed in the same direction, but with a slightly different perspective (parallax), or they are mounted on two camera levels which are merged to a single level by using a partial mirror (see exemplary set-up in WO 2011/029 426). Furthermore it is also possible to set up at least two cameras on at least two levels (see exemplary set-up in DE 10 2005 042 413). The resulting camera view angles are thereby pointed in the same direction as well and the recordings occur in slightly different perspectives. Since the position of the optical axes of the used lenses to each other changes depending on the mounting of the cameras/lenses and depending on the focal length, the characteristics of the lenses should be calibrated or the camera position(s) should be readjusted after each change of focal length to avoid offsets or parallaxes or otherwise wrongly calibrated pictures.

It also needs to be ensured that the left and right camera image is in precise correlation with the respective eyes.

Problem and Task

Currently the cameras used for three-dimensional recordings are usually only adjusted with a two-dimensional, rectangular calibration chart set-up. This makes the calibration very cumbersome and inaccurate, since a calibration chart which is set up at a specific distance only allows for conclusions on exactly that distance but not for a generally correct alignment or calibration at all depth levels/distances.

In addition, the incorrect correlation of right and left camera image channel to the respective eyes can lead to a so-called pseudoscopic space inversion. The depth information is thereby inverted so that a nearby object is seen as being at a distance, while a distant object seems nearby. This creates a mazy impression when looked at and is imperative to be avoided particularly in surroundings where a wrong connection could happen easily (e.g. in a live broadcast).

Solution to the Problem

To solve the mentioned tasks, the invention provides several designs which have in common that they incorporate at least two depth levels (levels at different distances) in the calibration, namely a nearer and a further level.

In the first solution option, a calibration chart is used, which has—preferably on a two-dimensional space—features for geometrical positioning, which are therefore used for the calibration of the geometric position of the cameras to each other.

These can be a cross, a dot, a possibly illuminated shape or pattern, a luminous diode or a reflecting or self-luminous or fluorescent object which in an optimal way is at a specific contrast to the surroundings for easier optic (by a human being) or electronic (by image recognition or similar methods) identification.

In addition, features for the calibration of further characteristics of the camera system can be in place such as features for the calibration of color, gray shades, exposure, resolution, stereo base (distance of the cameras to each other), convergence (pivot angle of the cameras to each other), sharpness, geometry of the lenses, chess pattern or similar.

A calibration element can contain one or multiple features by the aid of which two cameras can be aligned.

The term calibration chart generally refers to any two-dimensional calibration unit or device. This calibration chart is used for near calibration and is at least in parts transparent or a space is cut-out of it. This configuration allows a view on a second calibration chart positioned behind it in a defined distance or on another device with similar characteristics or another background for geometric positioning.

This background can contain natural or artificial calibration elements for distance calibration. This means distinctive objects or structures which can be clearly recognized in both camera pictures and based on which conclusions on the alignment of the optical axes of the cameras can be drawn.

This free view can be accomplished by either cutting a space out of the first calibration chart or device or by making a space transparent (see FIG. 1). A partially or entirely transparent calibration chart or device is also possible. This free view on the background can alternatively be accomplished by arranging additional artificial calibration elements for distance calibration behind the calibration chart for near calibration in a way that they are visible next to or around the calibration chart.

The calibration chart for near calibration can be attached to a tripod or directly on the 3D recording device my means of a clamping system (e.g. with magnetic fasteners or by sticking, velcroing or clamping it on).

The second calibration chart or device positioned behind it for distance calibration with features for geometric positioning can for example be a well recognizable cross. Additional, separated calibration elements which are freely positioned on tripods or are attachable, particularly glueable and removable, to existing items in the recording room are also possible.

Alternatively or in addition to the above mentioned options, another distance level, for example in form of an entirely or in parts transparent space, allows judgment of the correct attribution of left and right picture channel. This additional distance level can ideally be a fold-out from the calibration chart or device to the front or to the back or can be attached as a clip-on. A magnetic attaching mechanism is also a possibility. It makes sense that the additional distance level is equipped with a well recognizable pattern, a shape or a text, which shows if this distance level is also on the stereoscopic image (e.g. in the 3D projection) in front of or behind the calibration chart or device. If this is equal to reality, the attribution of left and right picture channel can be precisely determined.

Another solution option for the calibration of a multi-camera recording device for three dimensional picture recording, where the calibration occurs on at least two depth levels requires for distance calibration at least one natural or artificial calibration element to be in the distant depth level and for the near calibration at least one element for geographical positioning to be directly on or in the three-dimensional recording device.

It uses—particularly on a the three-dimensional recording device consisting of at least two essentially vertically to each other aligned cameras and a so-called mirror box, which divides the incoming object beams with the aid of at least one partial mirror up on the at least two camera levels—a temporary showing, projecting or mechanic inserting of at least one feature for geometric positioning directly on the three-dimensional recording device, e.g. on the partial mirror, at the bottom of the mirror box or on a clear glass in the optical path. This could for example be one or several laser points, lines, shapes or patterns, a different projection pattern or another optical element, which is transparent when not in use, (LCD or similar, electronically addable or removable element) in the beam path. With this so-called mirror box the at least one element for geometric positioning can alternatively consist of at least on light emitting element on or in the wall of the mirror box which in active mode sends light via reflection or transmission through the partial mirror in the at least two cameras and in inactive mode does not disturb the picture to be recorded or is not recognizable. A lens system can be attached to this light emitting element to be able to sharply display the light spot or the pattern even if the minimum near distance focus is underrun. The light emitting element can also be a whole with a flap, letting light from outside into the mirror box.

A mechanic insertion (e.g. retracting or inserting) of a passive or active (e.g. luminous) feature for geometric positioning is also possible.

It is also imaginable to have a box that is attachable to the three-dimensional recording unit in which the calibration elements for distance calibration as well as the calibration elements for near calibration are arranged, whereby a calibration is possible independently of light or other conditions of the surroundings.

All calibration elements can have active, switchable diodes or fluorescent areas for better recognition. The used active diodes can optionally send light at specific wave lengths, impulses or frequencies so that they do not disturb e.g. the user or are more easily recognized by automatic recognition algorithms.

For better positioning or a more exact calibration with software algorithms, the position of the calibration elements can either be determined with a measuring device from the three-dimensional recording device or via a return signal of the calibration charts or devices to a central computer interface. These may therefore have a transmission device or allow for conclusions regarding their distance through a passive device or encoding (e.g. via specific/defined distances from passive or active (self-luminous) points within these calibration charts or devices).

Another solution option for the calibration of a multi-camera recording device for three dimensional picture recording, where the calibration occurs on two depth levels envisages at least for near calibration at least one element for geometric positioning being attached to a pole which is attached to either the recording device or a separate tripod or is otherwise positioned.

DESCRIPTION OF FIGURES

FIG. 4 exemplifies two cameras K, which are mounted on a recording device for three-dimensional recording. This recording device consists among other things of a mirror box B and a partial mirror S. For the calibration, calibration features are shown on a temporarily transparent optical element O.

Figure 1:
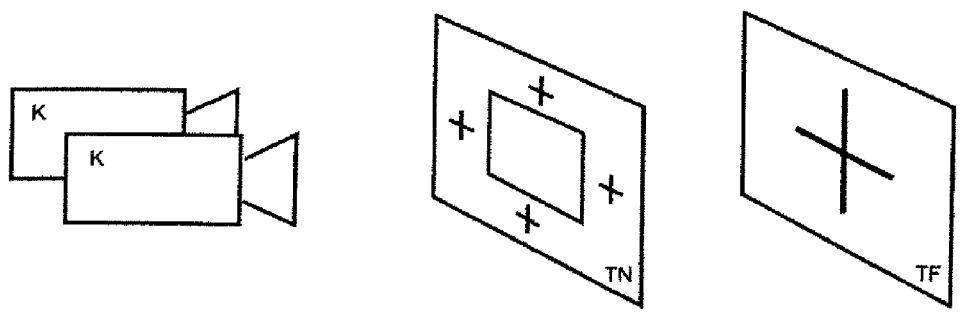
FIG. 1 exemplary shows two cameras K and a calibration chart TN for near calibration and a calibration chart TF for distance calibration.
Figure 2:
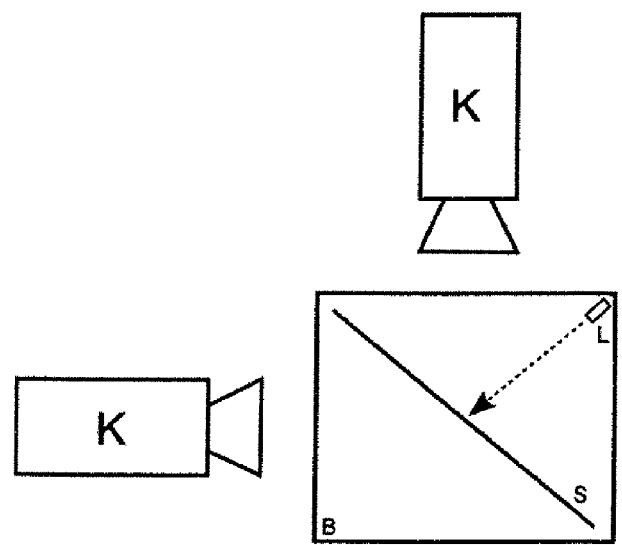
FIG. 2 exemplifies two cameras K, which are mounted on a recording device for three-dimensional recording. This recording device consists among other things of a mirror box B and a partial mirror S. For the calibration, e.g. a pattern is projected on the partial mirror S in the mirror box B with the aid of a light emitting element or laser L.
Figure 3:
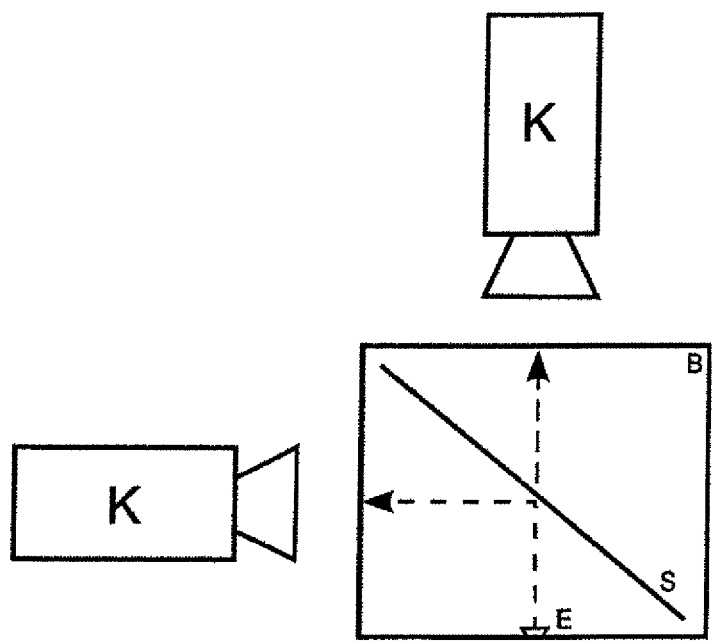
FIG. 3 exemplifies two cameras K, which are mounted on a recording device for three-dimensional recording. This recording device consists among other things of a mirror box B and a partial mirror S. For the calibration at least one reference point or pattern is projected on and through the partial mirror into both cameras with the aid of a light emitting element E on or in the wall or at the bottom of the mirror box B.

The invention claimed is:

1. A device for calibrating a multi-camera recording device for a three dimensional picture recording, said device comprising:
    a recording device including a mirror box and a partial mirror received in the mirror box;
    two cameras mounted on the recording device and aligned essentially vertically to each other, said partial mirror configured to divide an incoming object beam onto levels of the cameras;
    a natural or an artificial calibration element configured in a distant depth level for performing a distance calibration; and
    an element for determining a geometric positioning of the cameras relative to each other directly on or in the recording device for performing a near calibration.

2. The device of claim 1, wherein the element is configured to create a temporary fade-in for determining the geometric positioning on or in the recording device for performing a near calibration.

3. The device of claim 2, wherein the element for determining the geometric positioning includes a light emitting element on or in a wall of the mirror box, said light emitting element sending light via reflection or transmission through the partial mirror in the two cameras in an active mode without disturbing the picture to be recorded, or said light emitting element not being recognizable in an inactive mode.

4. The device of claim 3, wherein the light emitting element includes a lens system attached to the light emitting element.

5. The device of claim 1, wherein a laser point, line, shape, pattern or other projection pattern is projected into the mirror box.

6. The device of claim 1, wherein the element for determining the geometric positioning is a temporarily transparent optical element, said temporarily transparent optical element being in an image beam path for temporarily introducing a fading feature for the geometric positioning.

7. The device of claim 1, wherein the element for determining the geometric positioning is a mechanical element configured to be inserted manually or by a motor or retracted in an image beam path.

8. The device of claim 1, wherein the natural or the artificial calibration element for performing the distance calibration is attached and removed with a magnet or a Velcro or by gluing or plugging to an existing object.

9. The device of claim 8, wherein the calibration elements include an active switchable diode in at least one of the two depth levels.

10. The device of claim 9, wherein the active diode is configured to send light in specific wavelengths or impulses.

11. The device of claim 8, wherein the calibration elements have a fluorescent area in at least one of the two depth levels.

12. The device of claim 8, further comprising a measuring device for determining the position of the calibration elements from the three dimensional recording device to a central computer interface or via a return signal of the calibration elements of the two depth levels to the central computer interface.

13. The device of claim 12, further comprising a transmission and reception device or a passive device for determining a distance of the calibration elements.

* * * * *